US009430852B2

(12) United States Patent
Tatham et al.

(10) Patent No.: US 9,430,852 B2
(45) Date of Patent: Aug. 30, 2016

(54) DIGITAL CHECK IMAGE SHIFTING IN A CAROUSEL DISPLAY

(71) Applicant: Bank of America Corporation, Charlotte, NC (US)

(72) Inventors: Anne D. Tatham, Charlotte, NC (US); Milton Santiago, Jr., Chicago, IL (US); Christopher Hope, Tonbridge Kent (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/576,279

(22) Filed: Dec. 19, 2014

(65) Prior Publication Data

US 2015/0106272 A1    Apr. 16, 2015

Related U.S. Application Data

(63) Continuation of application No. 13/917,942, filed on Jun. 14, 2013, now abandoned.

(51) Int. Cl.
*G06Q 20/42* (2012.01)
*G06T 11/00* (2006.01)
*G06Q 20/04* (2012.01)

(52) U.S. Cl.
CPC ......... *G06T 11/001* (2013.01); *G06Q 20/0425* (2013.01)

(58) Field of Classification Search
None
See application file for complete search history.

(56) References Cited

U.S. PATENT DOCUMENTS

| | | | |
|---|---|---|---|
| 6,854,088 B2 * | 2/2005 | Massengale et al. | 715/764 |
| 7,970,706 B2 * | 6/2011 | Keene | 705/45 |
| 2011/0270755 A1* | 11/2011 | Pinski | 705/44 |
| 2014/0067661 A1* | 3/2014 | Elischer | G06Q 20/042 705/39 |

* cited by examiner

*Primary Examiner* — Robert R Niquette
*Assistant Examiner* — Joseph W King
(74) *Attorney, Agent, or Firm* — Weiss & Arons LLP; Michael A. Springs, Esq.

(57) ABSTRACT

Apparatus and methods are provided for viewing a check image and selecting a check service to be applied to a check. Check services may include a pay/return decision. The check images may be presented in a carousel view without pop-up windows. The user may import pre-selected check services such as stop payments. Check images may be marked with a status indicator. The status indicator may correspond to a check service applied to the check or a reconciliation error associated with the check. A user may receive notifications of pending expiration of an applied check service. The user may select and apply a check service at any time during a clearing process of the check. User may search for checks and check images based on the check service applied to the check. Search results may include check images and may be transmitted to a requested location such as via e-mail.

5 Claims, 10 Drawing Sheets

IMPORT FILE

| Check Service | Expiration Time | ID | Date | Payee | Amount | Currency | Account No. |
|---|---|---|---|---|---|---|---|
| Stop | 4/28/13 | BP333 | 4/21/13 | XYZ Corp. | 120,000.00 | USD | xxxxx6780 |
| Hold | 4/25/13 | BP332 | 4/21/13 | ABC, SA | 345,678.00 | EUR | xxxxx55567 |
| Pay | - | 156 | 4/21/13 | QWE, LLC | 15,000.00 | USD | xxxxx6780 |
| Pay | - | 155 | 4/20/13 | ASD, INC | 23,000.00 | CAD | xxxxx56696 |

FIG. 4

ISSUE FILE

| Image | Status | ID | Issuer | Date | Payee | Amount | Currency | Account No. |
|---|---|---|---|---|---|---|---|---|
| ○ | PIP | BP333 | BP | 4/21/13 | XYZ Corp. | 120,000.00 | USD | xxxxx6780 |
| □ | STOP | BP332 | BP | 4/21/13 | ABC, SA | 345,678.00 | EUR | xxxxx55567 |
| ○ | HOLD | 156 | P | 4/21/13 | QWE, LLC | 15,000.00 | USD | xxxxx6780 |
| □ | AFFRM/PIP | 155 | P | 4/20/13 | ASD, INC | 23,000.00 | CAD | xxxxx56696 |

FIG. 9

DIGITAL CHECK IMAGE SHIFTING IN A CAROUSEL DISPLAY

FIELD OF TECHNOLOGY

Aspects of the invention relate to treasury management of expenditures paid by check.

BACKGROUND

Although transactions are increasingly executed online and using transaction cards, checks continue to be used for executing transactions. A check includes an order of a payer to a financial institution. The order directs the financial institution to pay an amount to a payee.

A financial institution that is subject to an order to pay the amount on behalf of the payer may be a drawee bank. The payer orders the drawee bank to pay the amount. The amount may be debited from an account of the payer held at the drawee bank.

The payee may receive the check as payment for services or goods provided to the payer. The payee may receive the check directly from the payer. The check may be issued by a bill-pay vendor. The bill-pay vendor may provide check issuing services to the payer. The bill-pay vendor may receive payment instructions from the payer. The payment instructions may direct the bill-pay vendor to generate one or more paper checks. The bill-pay vendor may convey the paper check to the payee.

The payee may present the check for deposit at a depositary financial institution (hereinafter, "depositary bank"). The payee may request that that the amount recorded on the check be credited to an account of the payee. The depositary bank may provide financial services to the payee. A service provided by the depositary bank may include processing of a check issued by the payer.

Processing of a check may include receiving a check from the payee. Processing may include receiving a request from the payee to credit an account of the payee. The credit may correspond to an amount handwritten by the payer on the check.

The depositary bank may receive the check and transmit a copy of the check to the drawee bank. The depositary bank may request that the drawee bank transfer funds to the depositary bank. The funds may correspond to the amount indicated on the check. The funds may be credited to an account of the payee held at the depositary bank. A check clearing process may begin with a deposit of a check by a payee and terminate with a transfer of funds from a drawee bank to a depositary.

The drawee bank may provide services to the payer. The services may include check services. The check services may include fraud detection services. Check fraud may include a printing of a check that is not authorized by the payer, the bill-pay vendor or the drawee bank. Check fraud may include presenting a check for deposit without authorization from the payer.

Check services may include presenting a deposited check to the payer for confirmation. A digital image of the deposited check may be presented. The drawee bank may not process a check for payment to the payee unless confirmation is received from the payer. Check services may include stopping payment on a check or temporarily suspending a clearing process of the check. Check services may include, prior to debiting an account of the payer, reconciling a deposited check with a ledger maintained on behalf of the payer. Check services may include filtering deposited checks for suspicious or out-of-pattern checks.

Various check services provided by the drawee bank may streamline a processing of checks and reduce incidence of check fraud. However, a drawee bank may not have access to all checks issued by a payer. For example, checks issued on behalf of the payer by a bill-pay vendor may not be available to the drawee bank until the payee deposits the check. Without prior information relating to each check associated with a payer, a drawee bank may be unable to provide a full variety of check services to the payer.

Furthermore, a selection of one or more check services may depend on one or more attributes of a check. For example, to determine whether to initiate a "stop payment" on a check, a payer may wish to visually examine one or more segments of the check. Upon visual inspection, a signature segment may be found to include a signature that does not correlate to a known signature of the payer. A visual inspection of the check may indicate that a numerical segment stating the amount does not correspond to a segment describing the amount in words. However, a visual inspection may be associated with time and labor costs.

It would be desirable to provide a treasury management system that provides check services available in conjunction with a display of one or more check images. It would be desirable, to provide a display of checks and check services to a payer in a manner that allows a payer to efficiently view a plurality of checks and identify unauthorized checks. Therefore, it would be desirable to provide apparatus and methods for digital check image shifting.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows illustrative information in accordance with principles of the invention;

FIG. 9 shows illustrative information in accordance with principles of the invention.

DETAILED DESCRIPTION OF THE INVENTION

Figure 1:
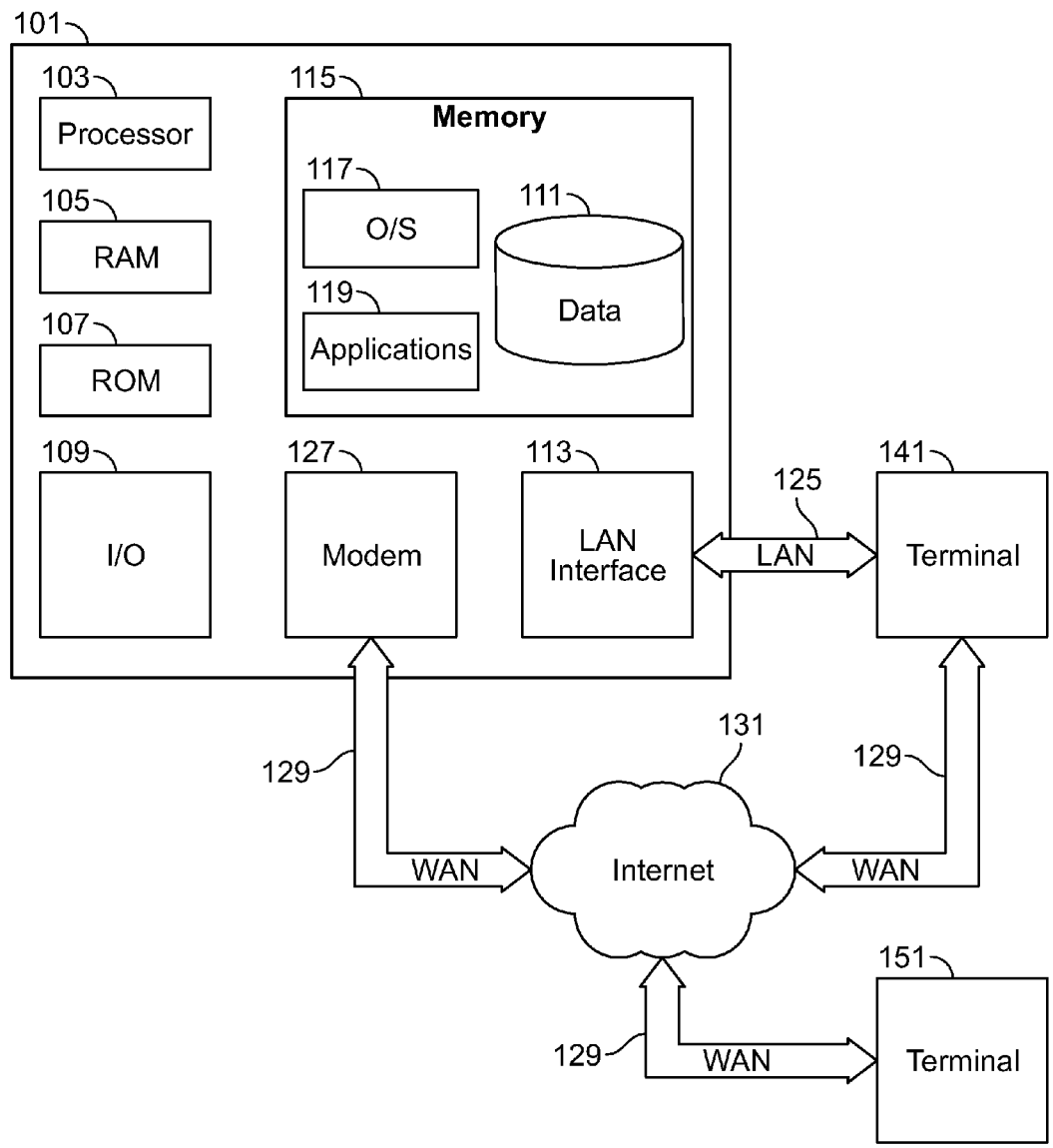
FIG. 1 shows an illustrative apparatus in accordance with principles of the invention.

Apparatus and methods for digital check image shifting are provided. Such shifting may involve shifting between images that relate to a funds transfer from a payer to a payee.

Methods for transferring funds from a payer to a payee are provided. The methods may include receiving a payment amount from the payer. The methods may include issuing a paper check for the payment amount. The check may be issued to the payee. In response to a deposit of the paper check by the payee, the methods may include generating a digital image of the paper check. The digital image may be generated by a depositary bank. The digital image may be generated by the drawee bank.

The methods may include generating an approval indicator. The approval indicator may be positioned adjacent to the digital image. The approval indicator may be embedded within the digital image. A close proximity of the approval indicator to the digital image may allow the payer to view the digital image while making an approval decision.

The approval indicator may allow a payer to approve the information included in the digital image. Selection of the approval by the payer may correspond to an approval of the information. A drawee bank may request approval from the payer before transferring the amount indicated on a check to a payee. For example, a payer may instruct a drawee bank to obtain approval from the payer before paying a check for an amount above a threshold amount. The payer may instruct the drawee bank to obtain approval from the payer before paying a check that includes any suitable attribute specified by the payer. The drawee bank may implement fraud detection algorithms that include requiring the payer to approve a check flagged by the drawee bank. The drawee bank may not clear a flagged check without receiving approval from the payer.

Approval by the payer of the digital image may include authorizing the drawee bank to withdraw funds from an account of the payer. Approval of the digital image may include an agreement by the payer not to contest payment of a check corresponding to the digital image. The approval indicator may be positioned adjacent to the digital image when the digital image is displayed to a payer. The payer may select the approval indicator when viewing the digital image.

In response to a selection of the approval indicator, the methods may include withdrawing funds corresponding to a payment amount indicated on the check. The funds may be withdrawn from an account of the payer. The funds may be withdrawn from the account of the payer and transferred to a holding account at the drawee bank. The funds may be held in the holding account for a duration of a clearing process associated with the check. The payer may continue to earn interest on the funds held in the holding account. The funds may be transferred to an account of the payee at the depositary bank. The payer may cease earning interest on the funds when the funds are transferred to the depositary bank.

The methods may include generating a selectable disapproval indicator. The disapproval indicator may be positioned adjacent to the digital image. Positioning the disapproval indicator in close proximity to the digital image may allow a payer to make a disapproval decision while viewing the digital image.

The payer may select the disapproval indicator. Selecting the disapproval indicator may correspond to payer rejecting a check. Rejecting the check may include placing a stop on the check or returning the check. In response to a selection of the disapproval indicator, the drawee bank may confirm receipt of the disapproval instructions from the payer. In response to a selection of the disapproval indicator, the methods may include sequestering and/or maintaining funds corresponding to the payment amount of the check in the account of the payer. Selection of the disapproval indicator may correspond to placing a "stop payment" on the check. Initiating a stop payment on a check may correspond to aborting the check clearing process. If a stop payment is initiated, an account of the payee may not be credited in response to a deposit of the check.

The methods may include informing the payee, depositary bank or any suitable party of the approval or disapproval decision regarding the check.

The methods may include, in response to selection of the disapproval indicator, setting a time period for expiration of a sequestering and/or maintaining of funds corresponding to the amount of the check. The time period may be set by the payer, the drawee bank, government regulations or any suitable party. For example, selection of the disapproval indicator may correspond to placing a hold on the check. The hold may temporarily suspend a clearing process and suspend a transfer of funds associated with the check corresponding to the digital image. The payer may wish to place a hold on a check if the payer has detected an irregularity in the digital image. The payer may wish to further investigate the irregularity before placing a stop payment on the check or approving payment of the check. In some embodiments, the payer may wish to verify a quantity or quality of goods/services provided by the payee before confirming payment of the amount indicated in the digital image.

A time period set for expiration of a check service may be a first time period. When the time period is a first time period, the methods may include transmitting a notification to the payer prior to expiration of the first time period. The notification may remind the payer of a pending expiration of a check service such as a hold or stop payment. The notification may set a second time period for expiration of the check service. After expiration of the second time period, the drawee bank may pay the amount indicated on the check. After expiration of the second time period, the drawee bank may place a permanent stop payment on the check. The payer may instruct the drawee bank to take any suitable action or apply any suitable check service in response to expiration of a time period. The drawee bank may implement a set of default actions that will be taken after expiration of a time period. Illustrative check services are shown below in Table 1.

TABLE 1

Illustrative check services.
Illustrative Check Services

Hold payment
Stop/reject payment
Approve payment
Reconciliation
Contact payee for signature verification
Return of funds transferred to payee A paper check may be one of a plurality of paper checks. Each of the plurality of paper checks may be issued by a bill-pay vendor on behalf of a payer. Each of the plurality of paper checks may be issued directly by the payer. Each paper check, whether issued by the bill-pay vendor or directly by the payer, may be associated with a digital image. The digital image may be generated when the paper check is presented for deposit. The digital image may be one of a plurality of digital images.

When the paper check is a first paper check and the digital image is a first digital image, the methods may include displaying the first digital image to the payer in a first position and positioning a second digital image of a second paper check in a second position. The first position may correspond to an optimal viewing angle. In some embodiments, check services available for a particular check may only be displayed when the image corresponding to the check is in the first position. Upon receipt of a payer instruction, the methods may include shifting the second digital image into the first position.

The methods may include positioning a third digital image in the second position and upon receipt of a payer instruction, shifting the third image into the first position, skipping the second position. A digital image in any position may be shifting into the first position. The shifting may occur about an axis. The shifting may occur counterclockwise about the axis. A position about the axis may be defined by an angular distance from a reference position. The reference position may be an optimal viewing position. The shifting may occur clockwise about the axis. The shifting may occur from right to left across a screen. The shifting may occur from left to right across a screen.

Shifting the check images may provide an efficient method for presenting a plurality of check images to a viewer. Each check image may be presented together with check services that may be applied. A viewer may select one or more of the available check services while viewing an image.

The shifting of digitals images may allow a payer to "scroll" through a plurality of digital check images in an efficient manner. The shifting may provide a "carousel view" of digital check images to the payer. Each display of a digital image may include check services available with respect to the displayed digital image. Shifting of the digital images may allow a payer to make approval/disapproval decisions or apply any other check services to the displayed digital images in an efficient manner. In certain embodiments, the carousel may continue to be accessible for viewing checks although an ability of the payer to select a check service has been disabled.

When the paper check is one of a plurality of paper checks and the digital image is one of a plurality of digital images, the methods may include displaying each digital image to the payer in a carousel view. The carousel view may allow a viewer to view images by scrolling right, left, up, down, diagonally, in 3-D space or in any suitable direction. Each digital image included in the carousel view may include one or more check services available for the check corresponding to each image. Each digital image may be displayed in the carousel view in response to receiving an instruction from the payer. Each of the plurality of digital images may correspond to one of a plurality of paper checks issued by the bill-pay vendor.

In certain embodiments, preferably one or more checks in the carousel may be skipped by a viewer, thereby allowing the payer to view the checks in the carousel in any desired order.

The methods may include marking a digital image in response to selection of the approval indicator. The methods may include displaying the marking when the digital image is in the first position.

For example, in response to a payer selection of the approval indicator, a watermark may be applied to a displayed digital image. The watermark may indicate that the payer has approved payment of the check corresponding to the image. The watermark may be visible during subsequent viewing of the digital image.

The methods may include marking a digital image in response to selection of the disapproval indicator. For example, in response to a payer selection of the disapproval indicator, a watermark may be applied to a displayed digital image. The watermark may indicate that the payer has rejected payment of the check corresponding to the image. The rejection may correspond to placing a stop, a hold or returning the check corresponding to the digital image. The watermark may be visible during subsequent viewing of the digital image.

The methods may include applying a filter to check images. The filter may allow a viewer to view images that include a watermark corresponding to a check service. The filter may allow a viewer to view only watermarked images.

The methods may include, in response to a selection of the approval indicator, crediting an account of the payer interest that accrues on the funds corresponding to the payment amount until the payee receives the funds. In some embodiments, after selection of the approval indicator, the payer may retain control over funds earmarked for payment of the check until the funds are withdrawn from the account of the payer. In some embodiments, after selection of the approval indicator, the payer may be unable to access funds earmarked for payment of the check. Following selection of the approval indicator, a drawee bank may transfer funds earmarked for payment of the check to a holding account. The payer may continue to earn interest on the funds held in the holding account.

The methods may include receiving an import file. The import file may be created by the payer. The import file may be received from the payer. The import file may be received from the payer prior to a deposit of a check by the payee. The import file may include an identifier. The identifier may correspond to a check issued to the payee on behalf of the payer. The import file may include a check service corresponding to the identifier. For each of a plurality of digital images, the methods may include determining if the identifier in the import file corresponds to one of the plurality of digital images. Each of the plurality of digital images may correspond to a check deposited by a payee. The methods may include marking the digital image that corresponds to the identifier based on the check service in the import file corresponding to the identifier.

A check service may include any suitable check service such as approving a payment, placing hold/stop on a payment or returning a payment. Based on contents of the import file, a payer may submit a batch of check services that are to be applied to a plurality of issued checks. An application of the check service corresponding to a check may be indicated in a watermark applied to a digital check image when viewed by the payer.

A check service may include execution of a series of conditional steps. For example, if a payment amount of a deposited check is less than a threshold amount, payment of the check may be approved unless the check triggers a reconciliation error. A reconciliation error may be triggered if a ledger maintained by a payer does not include an entry corresponding to the deposited check. In response to detection of the reconciliation error, a hold may be placed on the payment amount. The hold may expire after a time period.

The import file may include a series of rules applied by the drawee bank after a default rule has been applied. The issue file may be created based on criteria provided by the payer. For example, if a check received by the drawee bank includes an amount above a threshold amount, the payer may instruct the drawee bank to place a hold on the check and present the check to the payer for further consideration.

In certain embodiments, at a time the reconciliation error is detected, the payment amount may have already been transferred to the payee. In response to detection of the reconciliation error, the payer may elect to return the check and recover the amount transferred to the payee.

If the payer does not take further action prior to expiration of the time period, the drawee bank may be authorized to debit an account of the payer for the payment amount. In certain embodiments, if the payer does not take further action prior to expiration of the time period, the payer may be unable to recover funds transferred to the payee.

In certain embodiments, the time period in which the payer may recover the funds may be divided into a plurality of time periods. Each of the time periods may be associated with a different operational status indicator. Each of the different operational status indicators may be associated with a different color. For example, during a first time period, the color of the operational status indicator may be green, which corresponds to a period in which the payer may be provided the greatest amount of time in which to make a decision regarding applying a check service, such as returning the check. During a second time period, the color of the operational status indicator may be yellow, which corresponds to a period in which the payer may be provided with some amount of time, less than the first time period, in which to apply a check service. The yellow operational status indicator may also indicate that, at the termination of a present time period, the operational status indicator will turn red, indicating that a payer can no longer apply a check service to the selected check.

Apparatus may include a treasury management system. The treasury management system may include a computer system. The computer system may include a screen, a processor and one or more non-transitory computer readable media. The non-transitory computer readable media may store instructions that, when executed by the processor, configure the computer to perform one or more actions and/or methods.

The actions the computer may be configured to perform may include generating a check image based on a paper check. The computer may be configured to receive a check image generated based on a paper check. The computer may decompose the check image into a plurality of fields or segments. The computer may apply a vetting routine to the plurality of fields. The vetting routine may compare contents of the one or more fields to payment information. The payment information may be received by a drawee bank prior to generation of the check image. The payment information may be included in an import file or payer ledger. Based on applying a vetting routine to the plurality of fields, the computer may mark the check image as an exception. The mark may be a watermark applied to the image.

The computer may be configured to display, to a payer, a check image, a mark associated with the check image and one or more check services associated with the check image. The one or more check services may include an approval indicator, a disapproval indicator or any suitable check service. Available check services may be embedded in the check image or displayed adjacent to the image.

In response to a selection of the approval indicator, the computer may be configured to withdraw funds corresponding to the payment amount indicated in the check image. The funds may be withdrawn from an account of the payer. The account of the payer may be held at the drawee bank.

In response to a selection of the disapproval indicator, the computer may be configured to transmit a non-payment notice to a payee. The non-payment notice may inform the payee that a check deposited for payment has been rejected by the payer.

The check image may be one of a plurality of check images. The computer may be configured to decompose each check image into a plurality of fields or segments. Based on applying the vetting routine to the plurality of fields, the computer may mark a subset of the plurality of check images as exceptions. The computer may detect an exception if contents of one or more of the plurality of fields do not correspond to a ledger entry. The ledger may include information received from any suitable entity that issues checks on behalf of a payer. The information may be received from a bill-pay vendor, a payee, a payer, a drawee bank, a depositary bank or other suitable source.

The check images marked as exceptions may form a subset of check images received by a drawee bank. The computer may embed an approval indicator in each member of the subset of exceptions. The computer may embed a disapproval indicator in each member of the subset. The computer may embed an indicator corresponding to any suitable check service. A selection of the embedded check service may instruct the drawee bank to apply the selected check service when processing the check corresponding to the image.

The computer may display to a payer a first member of the subset of exceptions in a first position. When an image corresponding to the first member of the subset is in the first position, the payer may be prompted to select a check service to apply to the image. In response to a selection of the check service, such as selection of an approval indicator or a disapproval indicator, the computer may be configured to shift the first member of the subset into a second position. The second position may correspond to an angular offset from an axis. The axis may be equidistant from the first position and the second position.

The computer may be configured to display to the payer a second member of the subset of exceptions in the first position. When an image corresponding to the second member of the subset is displayed in the first position, the payer may select one or more check services to be applied to the second member. Positioning a check image in the first position may correspond to prompting a payer to select a check service to be applied to the displayed check image.

The first position and the second position may form a portion of a carousel view of the first check image and the second check image. The carousel view may be characterized by each member of the subset being displayed in a position that appears to be angularly offset from an axis. Each member of the subset may be displayed in a position equidistant from the axis. The carousel view may provide a contextual layout for scrolling among members of the subset. When viewing check images in the carousel view, a payer may be shown images preceding or following a check image in the first position. When viewing check images in the carousel view, a payer may be shown only an image in the first position.

The computer may be configured to reduce a number of members in the subset in response to a selection, by the payer, of a check service to be applied to the member. For example, a payer may select an approval indicator or disapproval indicator displayed alongside a check image in the first position. For example, if the payer selects the disapproval indicator, the member may be removed from the subset of exceptions. The removed member may be added to a subset of check images to be processed in accordance with a check service selected by the payer.

The treasury system may provide filtering options that allow a user, such as a payer, to create a subset of check images received by a drawee bank based on criteria identified by the payer. For example, the payer may instruct the treasury system to create a subset of all check images that have been approved by the payer during a specified time period such as a week. In response to a request of the payer, the treasury system may display the subset created by the payer in a carousel view. Each member of the subset may include a watermark showing a status indicator associated with the check.

In response to a selection of the approval indicator, the computer system may be configured to periodically update a payer of a pending status of a check payment. For example, the treasury system may transmit a notice to the payer that includes an estimate of how much time will elapse before funds are withdrawn for payment of the check. The status may include any suitable status.

In some embodiments, the treasury system may transmit a notification to any suitable party. For example, if the payer initiates a stop payment on a check, a notice may be transmitted to the depositary bank and/or the payee. The notice may inform the depositary bank and/or payee that the payer has stopped payment on the check.

Apparatus for a treasury management system are provided. The treasury management system may include a computer system. The computer system may include a display, a processor, and one or more non-transitory computer readable media. The non-transitory computer readable media may store instructions that, when executed by the processor, configure the computer to perform one or more actions.

The computer may be configured to generate a check image based on a paper check. The computer may be configured to extract a plurality of fields or segments from the check image. The computer may be configured to generate an issue file. The issue file may include the plurality of fields or segments extracted from the check image. The issue file may include a plurality of entries. Each entry may correspond to a check. Each entry may include one or more of the plurality of fields extracted from the check image. For example, a check may include a check number that identifies the check. The issue file may include the check number.

The issue file may include a status corresponding to each entry. The status may correspond to one or more pre-selected check services to be applied to the entry. The check services may be applied to the entry by the drawee bank. The status indicator may indicate a denial or an approval of a payment of a deposited check corresponding to the entry in the issue file.

The issue file may be generated based on payment information available to a drawee bank. The payment information may include one or more ledger entries corresponding to checks issued by the payer. The ledger entries may include checks issued on behalf of the payer. The checks may be issued by a bill-pay vendor. The ledger entries may include checks that have not yet been deposited by a payee. The ledger entries may include checks that have been deposited by a payee.

The issue file may be generated based on input received from a payer. Each entry in the issue file may be presented to the payer adjacent to check services available for the displayed entry. Based on a viewing of the entry, the payer may select one or more check services to be applied to a check corresponding to the entry. The check services may be applied by a drawee bank after the drawee bank receives notice that a payee has deposited a check corresponding to the entry.

The computer may be configured to filter check images based on contents of the issue file. For example, a payer may issue checks of differing values. The payer may not wish to be burdened with affirmatively selecting, for each issued check, a check service to be applied. The payer may set up a series of rules to be applied to incoming checks received by the drawee bank. The rules may be included in an import file transmitted to the drawee bank.

The series of rules may include a default rule. The payer may define the default rule. The treasury management system may define the default rule. An exemplary default rule may include an instruction to pay each check deposited by payee if the check includes a payment amount that is less than a threshold amount. The default rule may be defined based on one or more of the plurality of fields extracted from an image of a deposited check.

Based on the plurality of fields of a check image, the drawee bank may identify a check image that includes a payment amount greater than the threshold amount. The drawee bank may generate an issue file that may include an identifier of the check and a status corresponding to the identifier. The status may correspond to a "hold" indicating that the drawee bank has placed a hold on the check. The check will not be paid by the drawee bank unless the payer authorizes the payment amount. The payer may authorize the payment amount in response to viewing an image of the check. The image may include additional check services that may be applied to the check.

A check image may correspond to one of the plurality of identifiers included in an issue file. For each check image that corresponds to an identifier included in the issue file, the computer may be configured to present, along with the check image, check services that may be selected by a viewer of the image. The check image may be displayed with a mark corresponding to the status indicator. For example, if a default rule has applied a hold to the check, a watermark with the word "hold" may be applied to the check image.

A plurality of fields or segments may be extracted from a check image. The computer may be configured to transmit a notification to the payee. The notification may include a status indicator corresponding to a watermark visible on a check image. For example, the treasury system may be configured to notify a payee if the payer has imposed a hold, stop or return on a check deposited by the payee.

A status indicator included in the issue file may correspond to any suitable check service applied to a check. For example, the status indicator may correspond to an approval of a payment amount on a deposited check.

The computer may be configured to embed in a check image an approval indicator and/or a disapproval indicator. The check image may be presented to a payer using the treasury system. A selection by the payer of the approval indicator or the disapproval indicator may update a status indicator associated with the check image.

For example, a payer-set default rule may instruct a drawee bank to pay all checks that include a payment amount less than a threshold amount. However, the payer may be involved in an ongoing dispute with a payee and may wish to place all checks issued to the payee on hold until the payer reviews the check. The payee may be included in an entry of the issue file. Prior to review by the payer, a status indicator associated with each entry in the issue file that includes the payee may correspond to a "hold."

Each check image that includes the payee may be presented to the payer for review. Each check image presented to the payer may include check services available to the payer. The check services may include approving payment of the check, placing a stop on the check or if the check has been paid, returning the check. A selection by the payer of an available check service may override a current status indicator associated with the check.

A check image may be one of a plurality of check images. The computer may be configured to identify a subset of the plurality of check images. The subset may be defined by rules included in the import file. The subset may include each check image that includes a value or specified content in one or more of the plurality of fields extracted from the check image. The computer may be configured to present the subset and available check services to the payer using a carousel view. Presenting the subset to the payer using a carousel view may allow the payer to quickly view the subset and decide which check service should be applied to each member of the subset.

Apparatus for a treasury management system are provided. The treasury management system may include a computer system. The computer system may include a screen, a processor and one or more non-transitory computer readable media. The non-transitory computer readable media may store instructions, that when executed by the processor, configure the computer to perform one or more actions. The instructions may configure the computer to perform a reconciliation process.

The instructions may configure the computer to receive a check image. The check image may be generated based on a deposited paper check. The paper check may be deposited by a payee. The payee may have received the paper check from a bill-pay vendor or directly from a payer.

The computer may be configured to extract a first plurality of fields or segments from the check image. Illustrative fields are show above below in Table 2.

TABLE 2

| Illustrative check fields or segments |
| Illustrative check fields |
| --- |
| Check number |
| Check number |
| Customer name |
| Customer address 1 |
| Customer address 2 |
| Routing number |
| Account number |
| Payee |
| Payee endorsement |
| Payee |
| Date |
| Amount |
| Dollars |
| Comment |
| Signature |
| Bar Code |

The computer may be configured to identify, based on the first plurality of data segments: a payer, a payment amount and a payee. In some embodiments, the check may have not yet been paid and a clearing process may be in progress. If the check has not yet been paid, the computer may be configured to suspend the clearing process associated with the check image.

In some embodiments, the check may have already been paid. If the check has been paid, the computer may be configured to attempt to reconcile one or more of the plurality of data segments with a list of payments authorized by the payer.

The computer may be configured to compare the plurality of data segments to content of a ledger entry. The content of the ledger entry may include payment information. The payment information may be included on a check issued on behalf of a payer. The payment information may be received from a bill-pay vendor or directly from the payee. The ledger may be maintained by a financial institution on behalf of a payer. The financial institution may be a drawee bank.

The comparing may determine a variance between one or more of the plurality of data segments extracted from a check image and contents of the ledger entry. A threshold variance may be set such that there may be no difference between one or more of the first plurality of data segments and contents of the ledger entry.

A variance may be a difference in "closeness" between a segment of a check and a ledger entry. Closeness may be a quantitative measure of the similarity between a segment of a check and content of a ledger entry based on the similarity of the contents of the check segment and the content of the ledger entry.

A closeness between contents of two or more segments may be represented as a vector of closeness between contents of the check segment and ledger entry. For example, content of a segment may include a string of alphanumeric characters. A closeness of segment B to ledger entry A may be scored, for example, based on the following illustrative equation:

$$C_{\bar{B},\bar{A}} = \Sigma_{i=1}^{I} \min(|B_i - A_{j, \forall j \in [1,J]}|^{2p})$$

Eqn. 1

The distance $\min |B_i - A_{j, \forall j \in [1,J]}|^2$ is a minimum distance between a character of B and any of the J characters of A. p is a multiplier that can be given any appropriate value. p may be given a large value to intensify the distribution of distances to reduce the effect of non-matching strings. The distance may be calculated, for example, as a Damerau-Levenshtein distance.

The content of a segment may include alphanumeric characters. The alphanumeric characters may be represented by ASCII characters, encoded ASCII characters, or any other form of character or code, whether binary, hexadecimal or any other encoding scheme.

If a result of the comparing indicates that the ledger entry differs by a first threshold variance from one or more of the first plurality of data segments, the computer may be configured to resume the clearing process associated with the check image. Resumption of the clearing process may include processing the check for payment to the payee.

A ledger entry may differ by a second threshold variance from the first plurality of data segments. The second difference may be greater than the first threshold difference.

If the ledger entry differs by a second threshold variance from the first plurality of data segments the computer may be configured to display to the payer a payment indicator adjacent to the check image. In response to selection by the payer of the payment indicator, the computer may be configured to abort the clearing process. Aborting the clearing process may correspond to placing a stop on the check corresponding to the check image or returning the check corresponding to the check image.

The second threshold difference may correspond to one or more of the plurality of segments extracted from the check image being absent from the ledger entry. If the one or more of the plurality of segments extracted from a check image is not included in the ledger entry, the check associated with the segments may represent an unauthorized check or a potentially fraudulent check. The check may be flagged as an exception. The exception may correspond to a reconciliation error.

If a result of the comparing indicates that the ledger entry differs by a second threshold variance from the one or more of the first plurality of data segments, the computer may be configured to classify the check image as a payment exception. In some embodiments, if the check has been paid, and a result of the comparing indicates that the ledger entry is not identical to one or more of the first plurality of data segments, the computer may be configured to classify the check image as a payment exception.

Check images classified as exceptions may be displayed to a payer. A payment exception may correspond to a non-reconciled check. The display may include the check image corresponding to the payment exception. The display may include an approval indicator. The approval indicator may be embedded in the check image. The approval indicator may be displayed adjacent to the check image.

In response to a selection by the payer of the approval indicator, the computer may be configured to resume the clearing process. Selecting the approval indicator may correspond to providing consent to a drawee bank to transfer funds corresponding to a payment amount from the payer to the payee.

In response to a selection by the payer of the approval indicator, the computer may be configured to resume the reconciliation process. Selecting the approval indicator may correspond to providing consent to a drawee bank to adjust a ledger entry of the payer.

Upon receiving the selection of the approval indicator, the computer may be configured to adjust the ledger entry. The ledger entry may be adjusted to show that the payer has approved of a payment amount associated with a check. The approval may correspond to an override of a reconciliation error.

The ledger entry may be adjusted to show that a clearing process of the check has been suspended. The clearing process may remain suspended until further action is taken by the payer. The clearing process may remain suspended for a period of time. After expiration of the time period, a default check service may be applied. The payer may be notified prior to expiration of the time period. The notification may include time remaining until expiration of the time period.

Following an adjustment of the ledger entry the computer may be configured to transmit a status indicator to the payer. The status indicator may include one or more data segments associated with a payment exception. The status indicator may include an expiration time associated with a stop payment indicator, approval indicator, hold indicator or any suitable check service. The status indicator may include an option to extend the expiration time associated with a current status of a check. The computer may be configured to generate a display of check images based on the status indicator of each check image.

In some embodiments, in response to selection by the payer of a disapproval payment indicator, the computer may be configured to initiate a return of funds previously transferred to a payee.

In response to the selection by the payer of a check service, the computer may be configured to wait for expiration of a time period. In some embodiments, the check service may only be selected during the time period. The time period may be any suitable time period such as an hour, a day, a week, a month or a year. After expiration of the time period, the computer may be configured to resume a clearing process or reconciliation process.

Selection of a check service may resume of the clearing process or reconciliation process. A resumption of the clearing process may include a process for withdrawing funds from an account of the payer and transferring the funds to an account of the payee. A resumption of the reconciliation process may include reconciling another check.

In response to a selection of a check service to be applied to a check, the computer may be configured to override a reconciliation error. Overriding the reconciliation error may include resuming a clearing process of the check. The reconciliation error may correspond to receiving a check image that includes payment information not recorded in the ledger. In response to the selection of a check service, the computer may be configured to transmit a status indicator to the payee. The status indicator may correspond to a clearing process status. The clearing process status may inform the payee how much time remains before funds may be withdrawn from an account of the payer. The clearing process status may inform the payee how much time remains before funds may be credited to an account of the payee.

The computer may be configured to identify a check service applicable to a check based on the plurality of fields extracted from the check image corresponding to the check. The computer may be configured to identify an applicable check service based on: the plurality of fields, a prior check service applied to the check and/or an expiration time associated with the prior check service.

The computer may be configured to determine an available check service. The determination may be based on information in a plurality of check segments. The computer may be configured to determine an available check service based on a default check service applied to the check. For example, a payer may only wish to stop checks above a threshold amount. If a payment amount extracted from a check image includes an amount less than the threshold amount, the check image may not be associated with a stop payment indicator. As a further example, if a default check service applied to an image is a suspension of the clearing process, the check image may be displayed to the payer alongside check services corresponding to an extension of the suspension, a permanent stop or an approval of the payment amount.

The computer may be configured to determine a default status indicator based on the plurality of segments extracted from a check image. The plurality of segments extracted from the check image may include information corresponding to one or more criteria associated with a default check service. The criteria may be defined by the payer, payee, drawee bank, depositary bank or any suitable party.

The computer may be configured to determine an available check service based on a status indicator associated with a check. The status indicator may be included in the issue file. For example, after a termination of a clearing process associated with a check, the computer may be configured to display a return payment indicator adjacent to the check image. The return payment may indicate that the payer may recover funds paid on the check. The payer may recover the funds after the funds have been withdrawn from an account of the payer. The payer may recover the funds after the funds have been transferred to an account of the payee. A financial institution, such as a drawee bank, may charge a fee to provide a return payment service to a payer. The return payment service may be limited by a dollar amount or a frequency of use restriction.

The computer may be configured to filter the plurality of check images. The computer may filter the check images in response to a query received from the payer. The plurality of images may be filtered based on: a plurality of data segments applied to each exception, a check service applied to each exception and/or an expiration time associated with an applied check service. One or more check images that include the criteria listed in the query may be transmitted via email or other methods of communication.

For example, an exception may be one of a plurality of exceptions. The computer may be configured to filter check image corresponding to the plurality of exceptions. In response to a query received from the payer, the computer may be configured to transmit a subset of the plurality of exceptions to the payer. The subset of the plurality of exceptions may be displayed to the payer using a carousel view.

The computer may be configured to transmit a status indicator to the payer. The status indicator may correspond to a reconciliation status. The reconciliation status may correspond to an ability of the payer to approve or return a payment. For example, the ability of the payer to return a payment may depend on the payer making a return decision within a time period set by a drawee bank. The status indicator may include an expiration time associated with a check service.

Apparatus may include a check processing system. The check processing system may include a scanner. The scanner may be configured to generate digital information corresponding to a paper check. The digital information may include one or more segments extracted from the paper check.

The check processing system may include a processor. The processor may be configured to execute machine readable instructions. The check processing system may include a non-transitory machine readable memory storing the machine readable instructions. The instructions, when executed by the processor, may configure a computer system to perform one or more tasks. The computer system may be configured to extract one or more segments from a digital image of a paper check. The extracted segments may include: a payer, a date, a payment amount, a payee or any suitable segment shown above in Table 2.

The computer system may suspend a clearing process of the payment amount. The computer may suspend the clearing process in response to receipt of the digital image. Suspending the clearing process may temporarily prevent a withdrawal of the payment amount from an account of the payer. If a master ledger includes the payer, the date, the payment amount and the payee, the computer may be configured to resume the clearing process. A presence in the master ledger of the payer, the date, the payment amount and the payee may indicate that the payer has authorized the paper check.

The master ledger may include data received from the payer. The master ledger may include data received from a vendor authorized to issue paper checks in the name of the payer. The vendor may be a bill-pay vendor.

If the master ledger does not include the payer, the date, the payment amount and the payee, the computer system may be configured to flag the digital image as an exception. An exception may correspond to a reconciliation error. The computer system may be configured to apply a first check service option to the exception. The first check service may be a stop or any suitable check service shown above in Table 1.

The computer system may be configured to present to a payer: the digital image, an expiration time associated with the first check service option and a second check service option. The expiration time may correspond to a time when a stop applied to the exception expires. The expiration time may correspond to a time when a default check service set by the payer is scheduled to expire. The second check service option may correspond to a stop override such as an approval or any suitable check service shown above in Table 1.

The expiration time may be a first expiration time. In response to a payer selection of the second check service option, the computer system may be configured to present to the payer: the digital image and a second expiration time associated with the second check service option.

The computer system may be configured to select the first check service option based on one or more segments extracted from the digital image. The computer system may be configured to select the second check service option based on the first check service option and the expiration time associated with the first check service option.

The first check service may correspond to a stop payment. The expiration time may correspond to a reconciliation window. The reconciliation window may be time period during which if no action is taken by the payer, the drawee bank may apply a default check service. The default check service may correspond to a stop or any suitable check service shown above in Table 1. The reconciliation window may begin upon detection of a reconciliation error.

The computer system may be configured to transmit a status notification informing the payer of an expiration of the stop payment. The status notification may be transmitted to the payer periodically, preferably prior to an expiration of a reconciliation window.

Methods for check processing are provided. Methods may include receiving digital information corresponding to a paper check. The digital information may include a digital image. The methods may include extracting segments from the digital image. The segments may include a payer, a date, a payment amount, a payee or any suitable information shown above in Table 2.

Based on at least two of the segments, the methods may include suspending a clearing process associated with the paper check. If a master ledger includes an entry corresponding to the payer, the date, the payment amount and the payee, the methods may include resuming the clearing process. If the master ledger does not include the payer, the date, the payment amount and the payee, the methods may include flagging the digital image as an exception.

The methods may include, presenting, preferably prior to an expiration time, to the payer: the digital image, the expiration time and a check service option. The check service option may include any suitable check service such as those shown above in Table 1. The expiration time may correspond to a time when the clearing process is expected to resume with respect to a check. The expiration time may correspond to a time when the clearing process is expected to terminate with respect to a check.

The methods may include, prior to an end of the expiration time, receiving an instruction from the payer to resume a clearing process associated with the exception. The methods may include, preferably prior to an end of the expiration time, receiving an instruction from the payer to terminate a clearing process associated with the exception. Methods may include extending the expiration time in response to an instruction from the payer.

In response to receiving an instruction from the payer, the methods may include adjusting an entry in a master ledger. The adjustment may include updating a status of the entry in the master ledger. In response to receiving the instruction from the payer, the methods may include removing an exception flag associated with a digital image.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is a block diagram that illustrates a computing device 101 (alternatively referred to herein as a "server" and "computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for storing, transmitting and/or transporting relevant information.

Any information described above in connection with database 111, and any other suitable information, may be stored in memory 115. One or more of applications 119 may include one or more algorithms that may be used receive digital images, generate a carousel view of the images, process queries, return search results, transmit notifications and/or any other suitable tasks.

Figure 2:
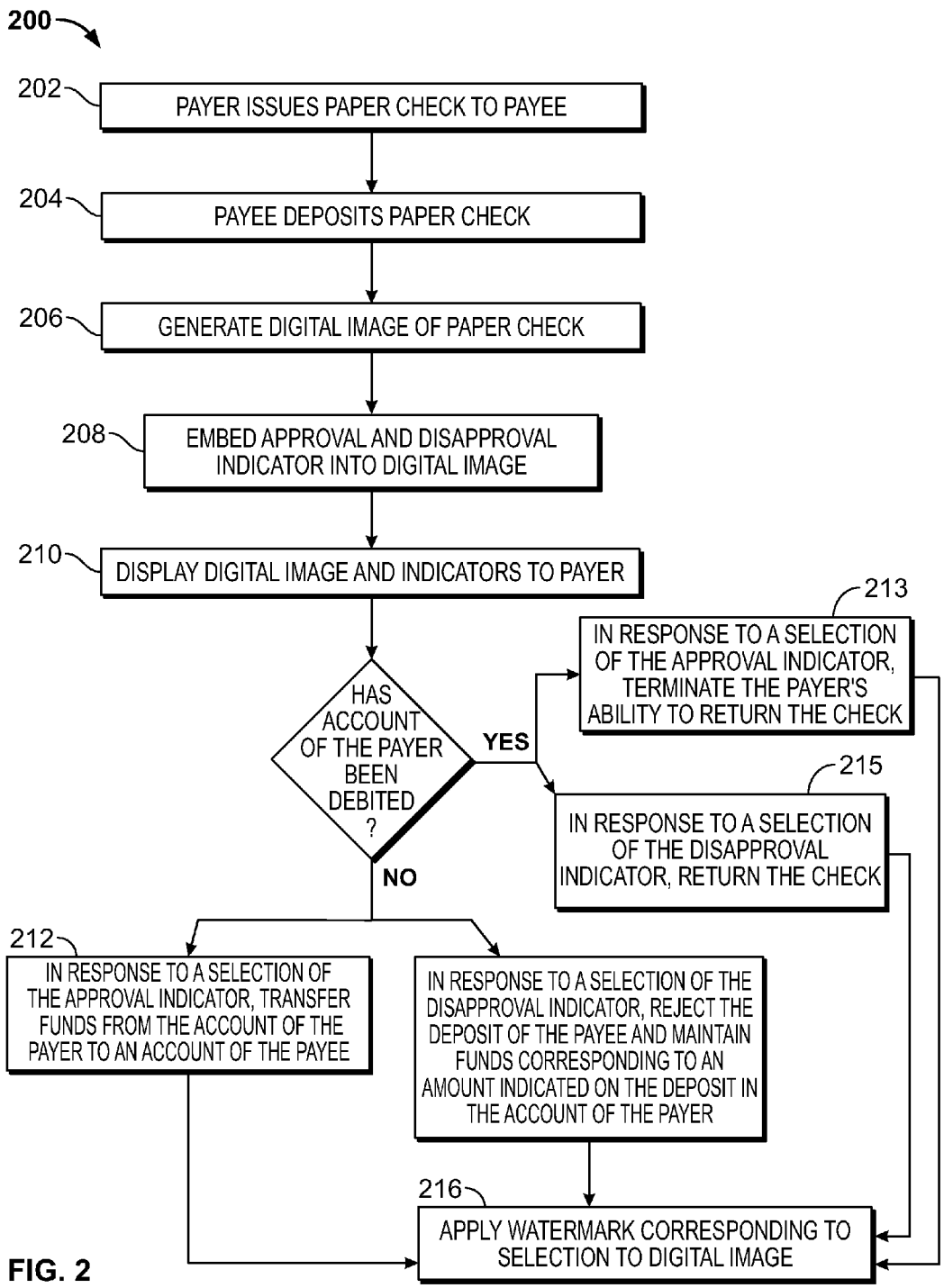
FIG. 2 shows an illustrative process in accordance with principles of the invention.

FIG. 2 shows illustrative process 200. For the sake of illustration, one or more of the steps of the process illustrated in FIG. 2 will be described as being performed by a "system." The "system" may include one or more of the features of the apparatus shown in FIG. 1 and/or any other suitable device or approach. The "system" may be provided by an entity. The entity may be an individual, an organization or any other suitable entity.

At step 202, a payer issues a paper check to payee. At step 203, the payee deposits the paper check. At step 208, the system generates a digital image of the paper check. At step 208, the system embeds an approval indicator and a disapproval indicator into the digital image. In some embodiments the approval/disapproval indicator may be displayed adjacent to the image. In some embodiments, the approval/disapproval indicators may be displayed substantially simultaneously with the digital image.

At step 210, the system displays the digital image and approval/disapproval indicator to the payer. In some embodiments, at step 212, in response to a selection of the approval indicator, the system transfers funds from an account of the payer to an account of the payee. The funds may correspond to an amount recorded in the digital image. The funds may correspond to an amount extracted from the digital image.

At step 214, in response to a selection of the disapproval indicator, the system rejects the deposit of the payee and maintains funds corresponding to an amount indicated on the deposit in the account of the payer. The amount indicated on the deposit may correspond to an amount recorded in the digital image. The amount indicated on the deposit may correspond to an amount extracted from the digital image.

At step 216, the system applies a watermark to the digital image. The watermark corresponds to the approval/disapproval selection. The watermarked image may be displayed in response to a request or input from a user of the system.

In some embodiments, at a time a digital image is displayed to the payer, a payment has already been made to the payee. At step 213, in response to a selection of the approval indicator, the system may terminate an ability of the payer to initiate a claw-back or return of the payment made to the payee. At step 215, in response to a selection of the disapproval indicator, the system may claw-back or return to the payer the payment made to the payee. The payer may be able to select the disapproval indicator within a specified time window. The time window may be between 12 and 24 from a time the payment was made to the payee.

Figure 3:
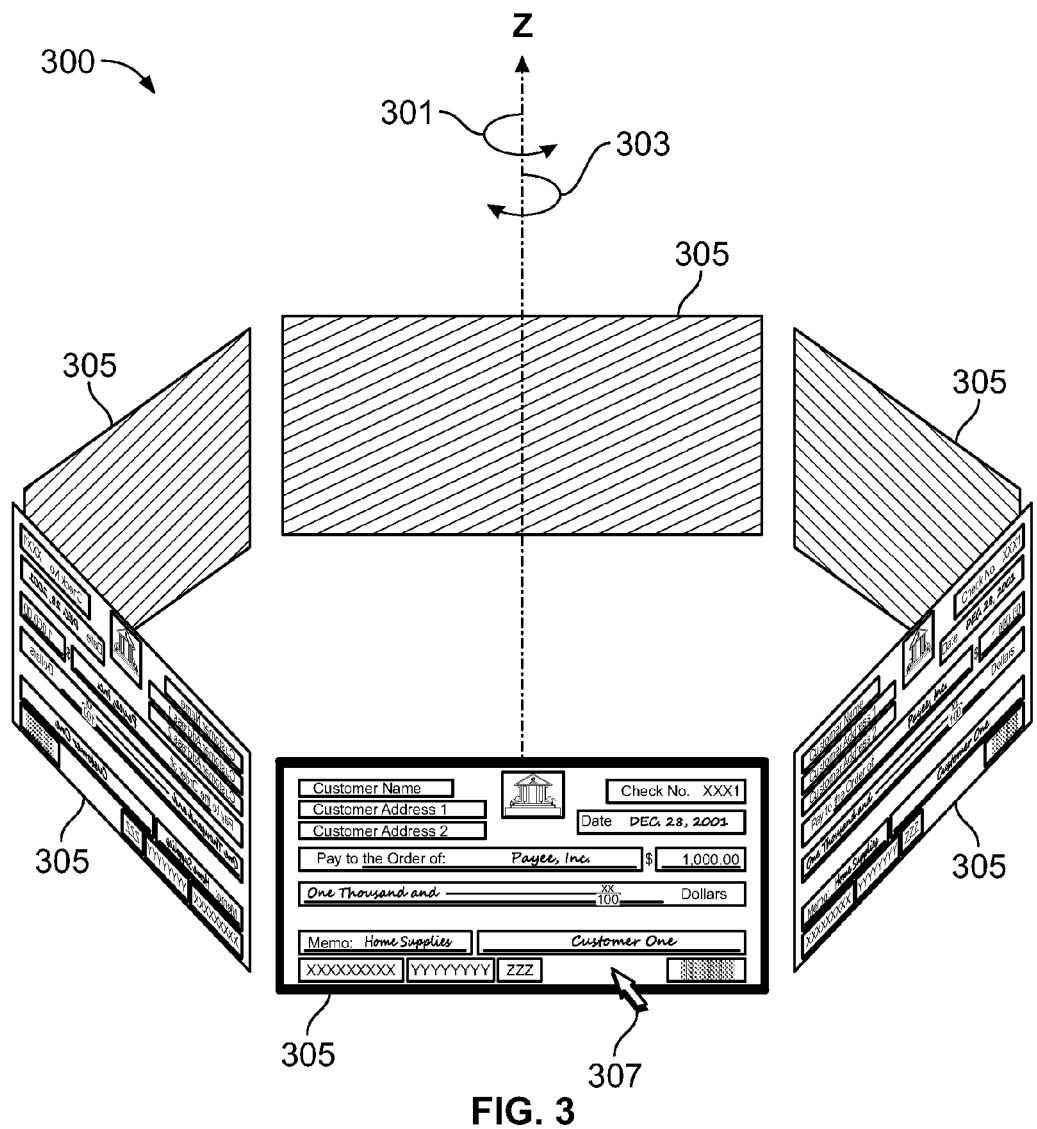
FIG. 3 shows an illustrative arrangement in accordance with principles of the invention.

FIG. 3 shows illustrative view 300. View 300 shows that checks 305 may be presented in a carousel view. Each of checks 305 may include different information recorded thereon. A viewer of checks 305 may use pointer 307 to rotate checks 305 about axis Z. In some embodiments, checks 305 may be presented on a touch sensitive screen. A viewer may "swipe" to rotate among checks 305. Checks 305 may be rotated counterclockwise about axis Z, as shown by arrow 301. Checks 305 may be rotated clockwise about axis Z, as shown by arrow 303.

When viewing checks 305, each of checks 305 may be presented with available check services that may be applied to the check. Illustrative check services are shown above in table 1.

FIG. 4 shows illustrative import file 400. Import file 400 may be created by a payer. The payer may import a set of rules to be applied to payment information received by a treasury management system. Column 401 lists check services selected by the payer. Each check service listed in column 401 may be associated with any of rows 403, 405, 407, and/or 409. For example, in column 401, import file 400 shows that the payer has selected a "stop" to be applied to the payment corresponding to row 403. The stop, when applied, prevents payee XYZ Corp. from receiving a payment of 120,000.00 in U.S. dollars.

Column 413 shows an identifier associated with each of rows 403, 405, 407, and 409. The identifier may correspond to a source of the information recorded in each row. For example, column 413 shows that row 405 is assigned an identifier of "BP332." "BP" may correspond to a bill-pay vendor that has submitted payment information to a treasury management system. "332" may be an identifier assigned by the treasury management system. "332" may be a check number.

Import file 400 includes column 411. Column 411 shows an expiration time associated with a check service listed in column 401. For example, column 411 shows that a stop associated with row 403 expires after Apr. 28, 2013. If a payee presents a request for payment listed in row 403 after Apr. 28, 2013, the request may be granted.

As a further example, column 411 shows that there is no expiration time associated with a "pay" decision in row 409. Any time payee ASD, Inc. deposits check number 155, payment to payee ASD, Inc. of 23,000.00 in Canadian dollars may be fulfilled.

When a check is received that corresponds to a row in import file 400, the check service listed in column 401 is applied to the check. In some embodiments, if import file 400 includes an entry corresponding to a check, the check or a digital image of the check may not be presented to the payer for further consideration.

Import file 400 includes columns 415, 417, 419, 421 and 423. Column 415 shows a date. The date may be a date indicated on a check deposited by a payee listed in column 417. The date may be extracted from a digital image of the deposited check. Column 419 shows an amount indicated on a check deposited by a payee listed in column 417. The amount may be extracted from a digital image of the deposited check. The amount may be identified based on deciphering a handwritten or printed entry on the deposited check.

Column 421 shows a currency associated with the amount in column 419. The currency may be indicated on the check. Column 423 shows an account number indicated on a deposited check. The account number may be identified based on MICR data printed on the check.

Figure 5A:
FIGS. 5A and 5B shows illustrative information in accordance with principles of the invention.

FIG. 5A shows illustrative information 500. Information 500 includes digital check image 509. Digital check image 509 may be generated based on a check deposited by a payee. The check may have been issued by a bill-pay vendor on behalf of a payer. The check may have been conveyed directly from the payer to the payee.

Digital check image 509 may be presented to a payer along with illustrative options 503, 505 and 507. Selecting option 503 corresponds to the payer approving payment of the amount included in the digital image. Selecting option 505 corresponds to the payer temporarily withholding payment of the amount included in the digital image. The "hold" may be defined by an expiration time. After the expiration time, a default check service may be applied to the payment request corresponding to digital image 509. Selection of option 507 corresponds to a rejection of the payment request corresponding to digital image 509.

Options 503, 505 and 507 may be presented to a payer when the payer selects one of checks 305 using pointer 307 (shown in FIG. 3). In some embodiments, options 503, 505 and 507 may be presented adjacent to each of checks 305 (shown in FIG. 3).

Figure 5B:

FIG. 5B shows illustrative information 501. Illustrative information 501 shows a "stop" watermark applied to digital image 511. The stop watermark may be applied to digital image 511 after a payer selects option 507 (shown in FIG. 5A). The stop watermark may be applied to at least one of checks 305 (shown in FIG. 3). The stop watermark may be visible on at least one of checks 305 when the payer selects one of checks 305 using pointer 307 (shown in FIG. 3). In some embodiments, a watermark applied to one of checks 305 may be visible regardless of a rotational location of the watermarked check about axis Z.

Figure 6:
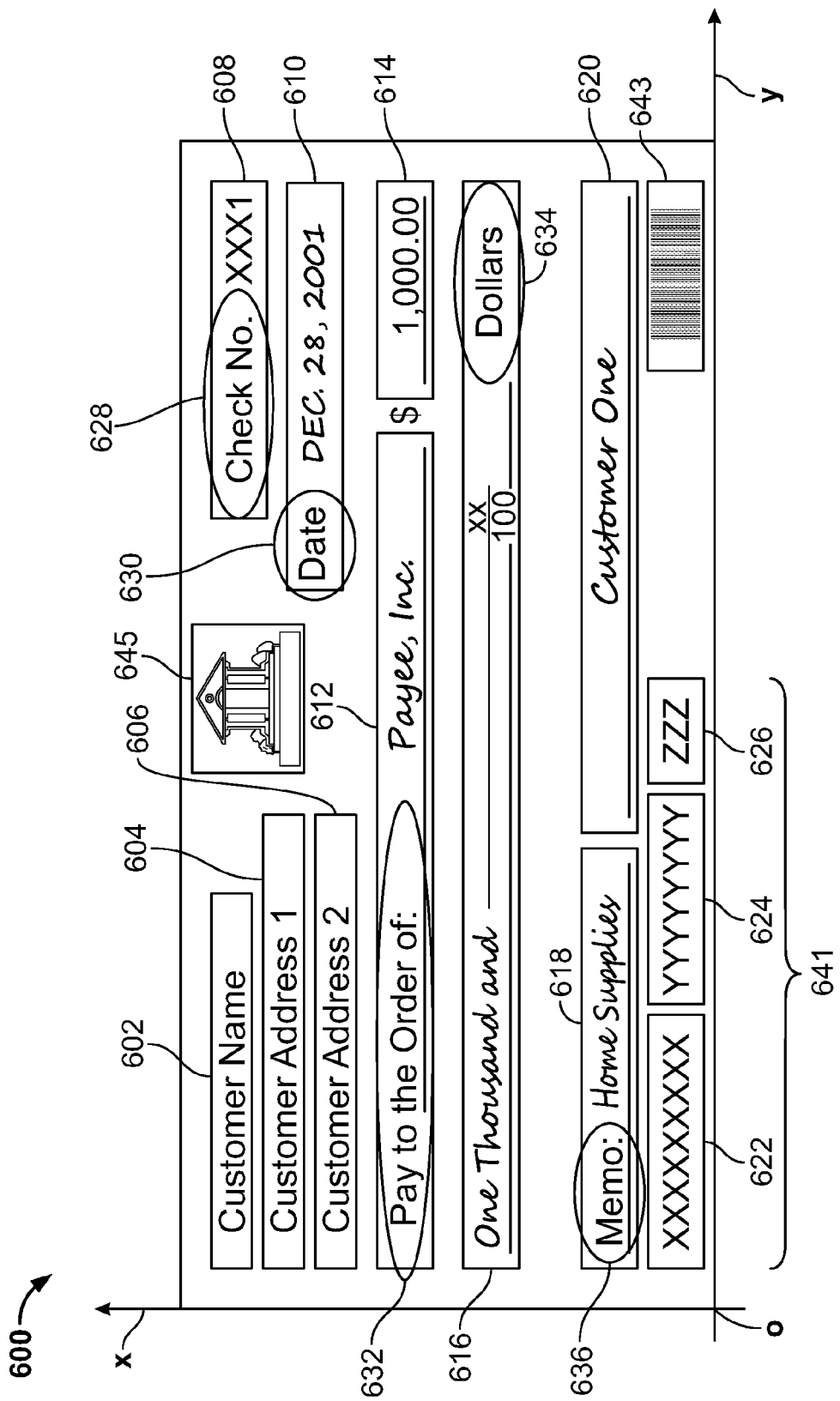
FIG. 6 shows illustrative information in accordance with principles of the invention.

FIG. 6 shows an illustrative digital front image 600 of an exemplary check. Front image 600 may include one or more field or segments. Each of the one or more segments may be completed by a handwritten entry. Each of the one or more segments may be completed by a printed entry. Handwriting may include cursive or script information written by hand or printed by machine. Printed character text may be block-style letters that are written by hand or printed by machine.

For example, a check issued by an individual payer may be completed by handwriting. A check issued by an institutional or commercial payer may be printed. A check may include a mix of printed and handwritten segments. For example, a check issued by a commercial entity may include printed MICR data and a handwritten signature.

Each segment of image 600 may correspond to information that may be included on the front of a check. In FIG. 6, a segment may be identified by rectangular boxes. For example, image 600 may include one or more of payer name segment 602, payer address 1 segment 604, payer address 2 segment 606, check number segment 608, date segment 610, payee segment 612, amount segment 614, dollars segment 616, comment segment 618, payer signature segment 620, routing number segment 622, account number field 624, check number field 626 and any other suitable segments.

Image 600 may include one or more segment identifiers. Each segment identifier may correspond to a type of information that is displayed on the check to identify a check segment. For example, check image 600 may include one or more of "check number" segment identifier 628, "date" segment identifier 630, "pay-to-the-order-of" segment identifier 632, "dollars" segment identifier 634, "memo" field identifier 636, drawee bank 645 and any other suitable segment identifiers. A drawee bank may be identified based on segment 645. Segment 645 may be a logo associated with a drawee bank. Segment 645 may include text associated with a drawee bank. Segment 645 may include address or name information associated with a drawee bank.

Figure 7:
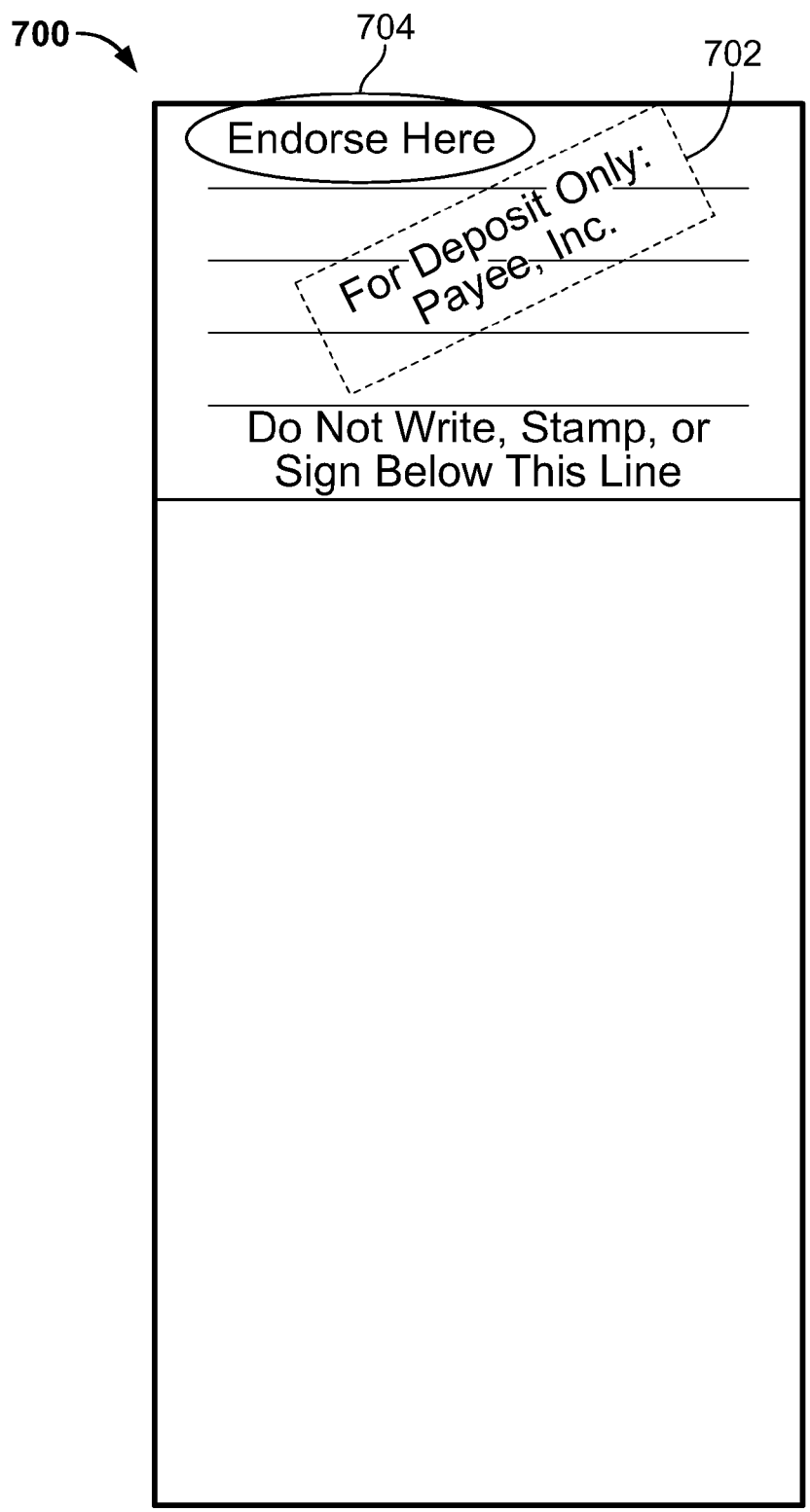
FIG. 7 shows illustrative information in accordance with principles of the invention.

FIG. 7 shows an illustrative digital back image 700 of an illustrative check. Back image 700 may include one or more segments. Each segment may correspond to a type of information that is included on the back of a check. In FIG. 7, segments are identified by rectangular boxes. For example, back image 700 may include payee endorsement segment 702 and any other suitable segments.

Back image 700 may include one or more segment identifiers. Each segment identifier may correspond to a type of information that is displayed on the check to identify a check segment. For example, check image 700 may include "endorse-here" segment identifier 704 and any other suitable segment identifiers.

Figure 8:
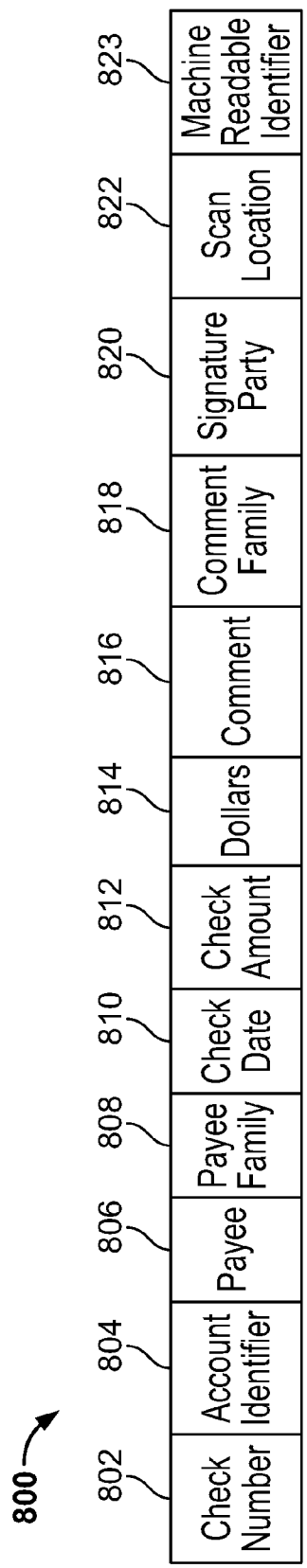
FIG. 8 shows illustrative information in accordance with principles of the invention.

FIG. 8 shows illustrative ledger entry 800. Ledger entry 800 may be generated based on images 600 (shown in FIG. 6) and 700 (shown in FIG. 7). The ledger entry may include information extracted from digital images 600 and 700. The ledger entry may include information obtained directly from a tangible or "hard copy" of a check. Ledger entry 800 may include one or more fields such as check number 802, account identifier 804, payee 806, payee family 808, check date 810, check amount 812, dollars 814, comment 816, comment family 818, signature 820, scan location 822 and machine readable identifier 823. Machine readable identifier 823 may include bar coded information.

Each of the fields may correspond to a segment of a check. The check may include one or more segment identifiers that correspond to the field. For example, the segment identifiers may include "DATE," "PAY TO THE ORDER OF," "DOLLARS," "MEMO" and any other suitable identifiers.

Information included in columns 413-423 of import file 400 (shown in FIG. 4) may be generated based on information extracted from images 600 and 700. Information included in an issue file (not shown) may be generated based on information extracted from images 600 and 700.

Table 3 shows illustrative ledger entry fields, illustrative corresponding check segments and illustrative corresponding segment identifiers.

For example, the location of a rectangular segment may be quantified as the coordinates of four corners of a rectangle. Any other suitable scheme for quantifying segment locations may be used.

Generating the ledger entry may include generating text data. The text data may be generated based on information extracted from the digital image. The text data may be generated based on a handwritten segment of the check. The text data may be generated based on information printed on the check.

Generating the ledger entry may include converting a signature from a handwritten entry into text. The converting may be performed by a processor. The processor may be further configured to run an application that translates content of a segment from handwriting to estimated block text. The application may be any suitable application.

TABLE 3

Illustrative ledger entry fields, illustrative corresponding check segments and illustrative corresponding segment identifiers.

| Illustrative ledger entry fields (FIG. 8 reference numeral) | Illustrative corresponding check segments (FIG. 6 reference numeral) | Illustrative corresponding form segment identifiers (FIGS. 6 or 7 reference numerals) |
|---|---|---|
| Check number (802) | Check number segment (608) Check number segment (626) | CHECK NO. (628) |
| Account identifier (804) | Customer name segment (602) Customer address 1 segment (604) Customer address 2 segment (606) Routing number segment (622) Account number segment (624) | |
| Payee (806) | Payee segment (612) Payee endorsement segment (702) | PAY TO THE ORDER OF (632) ENDORSE HERE (704) |
| Payee family (808) | Payee segment (612) | PAY TO THE ORDER OF (632) |
| Check date (810) | Date segment (610) | DATE (630) |
| Check amount (812) | Amount segment (614) | |
| Dollars (814) | Dollars segment (616) | DOLLARS (634) |
| Comment (816) | Comment segment (618) | MEMO (636) |
| Comment family (818) | Comment segment (618) | MEMO (636) |
| Signature (820) | Signature segment (620) | |
| Bar Code (823) | Bar Code segment (643) | |

The generating of the ledger entry may include extracting information from the digital image. The extracted information may include a payer's signature on the check.

An illustrative method for extracting information from digital image 600 (shown in FIG. 6) may include identifying an origin "O" of the front image 600. Origin "O" may be identified as a location on check image 600 from which to quantify the relative locations of the segments. For example, origin O may be coincident with the lower left corner of a check upon which check image 600 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes.

For example, the application may be an application such as that available under the trademark PARASCRIPT® from Parascript, LLC, Longmont, Colo. The application may pre-process the segment content by applying one or more mathematical filters to the segment content. The filter may include, for example, tools for line detection, edge detection, curve detection, shape detection, contrast adjustment, feature density (such as the amount of "ink" pixels per unit area of field or per unit length of a horizontal or vertical axis of the field), feature density distribution (such as the amount of "ink" pixels per unit area as a function of location in the field), topological quantification (such as the number, size, distribution and perimeter per unit area of closed forms in the content) and any other suitable tools.

For example, the text data may include a numerical identifier of the check. The numerical identifier may be the check number. The numerical identifier may include segment 608 (shown in FIG. 6). The text data may include the amount. The amount may correspond to numbers handwritten by the payer in field 614. The amount may correspond to words handwritten by the payer within segment 616.

The text data may include a drawee bank name. The drawee may be identified based on segment 645. Segment 645 may be a logo associated with a drawee. Segment 645 may include text associated with a drawee. Segment 645 may include address or name information associated with a drawee.

The text data may include an account number on the check. The account number may correspond to MICR data 641 printed on a check. Segment 641 may include a routing number 622. Segment 641 may include an account number 624.

The text data may include a payee. The payee may be identified based on information entered into segment 632. The text data may include any suitable information.

The processing of the digital image may be performed at a time the check is presented for deposit. The processing of the digital image may be performed by the depositary bank. The processing may be distributed among various machines and occur at various times and locations.

For example, at different times throughout a day, payees may present checks to a depositary bank for deposit. Each of the payees may utilize different depositary bank locations to present the checks for deposit. The depositary bank may process each check at a time the check is presented for deposit. The distribution of times and locations may alleviate a computing burden of processing digital images at a central location. The distribution of times and locations may alleviate a computing burden of processing digital images at a designated time.

Distributed processing of the digital image may allow a drawee bank to conduct a fraud analysis based on the ledger entry. The drawee bank may conduct a fraud analysis when the check is presented for deposit. The drawee bank may provide a fraud indicator to the payee and/or depositary bank at the time the check is presented for deposit.

The drawee bank may specify fields for inclusion in the ledger entry. For example, the drawee bank may specify that, for checks deposited in a particular area code, the ledger entry may only include the following check segments: MICR data, the payer's signature and the amount on the check. In other locales, the drawee bank may request that the ledger entry include information from one or more segments of a check.

FIG. 9 shows issue file 900. Issue file 900 may include status information on checks listed in import file 400 (shown in FIG. 4). In column 917, issue file 900 may provide access to images 600 (shown in FIG. 6) and 700 (shown in FIG. 7).

Issue file 900 includes status column 901. Status column 901 may show a current status of a payment. A payer may select a row displayed in issue file 900 and edit status column 901. When editing status column 901, the payer may select an available check service for the payment displayed in the row.

Issue file 900 includes column 903. Column 903 shows an identifier associated with each row of issue file 900. The identifier listed in column 903 may be extracted from a digital image of a check. The identifier listed in column 903 may be assigned by a drawee bank. For example, a drawee bank may assign identifier that includes "BP" to checks issued by a bill-vendor on behalf of a payer.

Issue file 900 includes column 905. Column 905 lists an issuer associated with a check. For example, column 905 shows that a "P" of "BP" has issued checks on behalf of a payer. "P" may correspond to check issued directly by the payer and "BP" may correspond to check issued by a bill-pay vendor on behalf of the payer.

Issue file 900 may include information extracted from images 600 and 700. Columns 907, 909 911, 913 and 915 may be based on information extracted from a digital image of a check.

Figure 10:
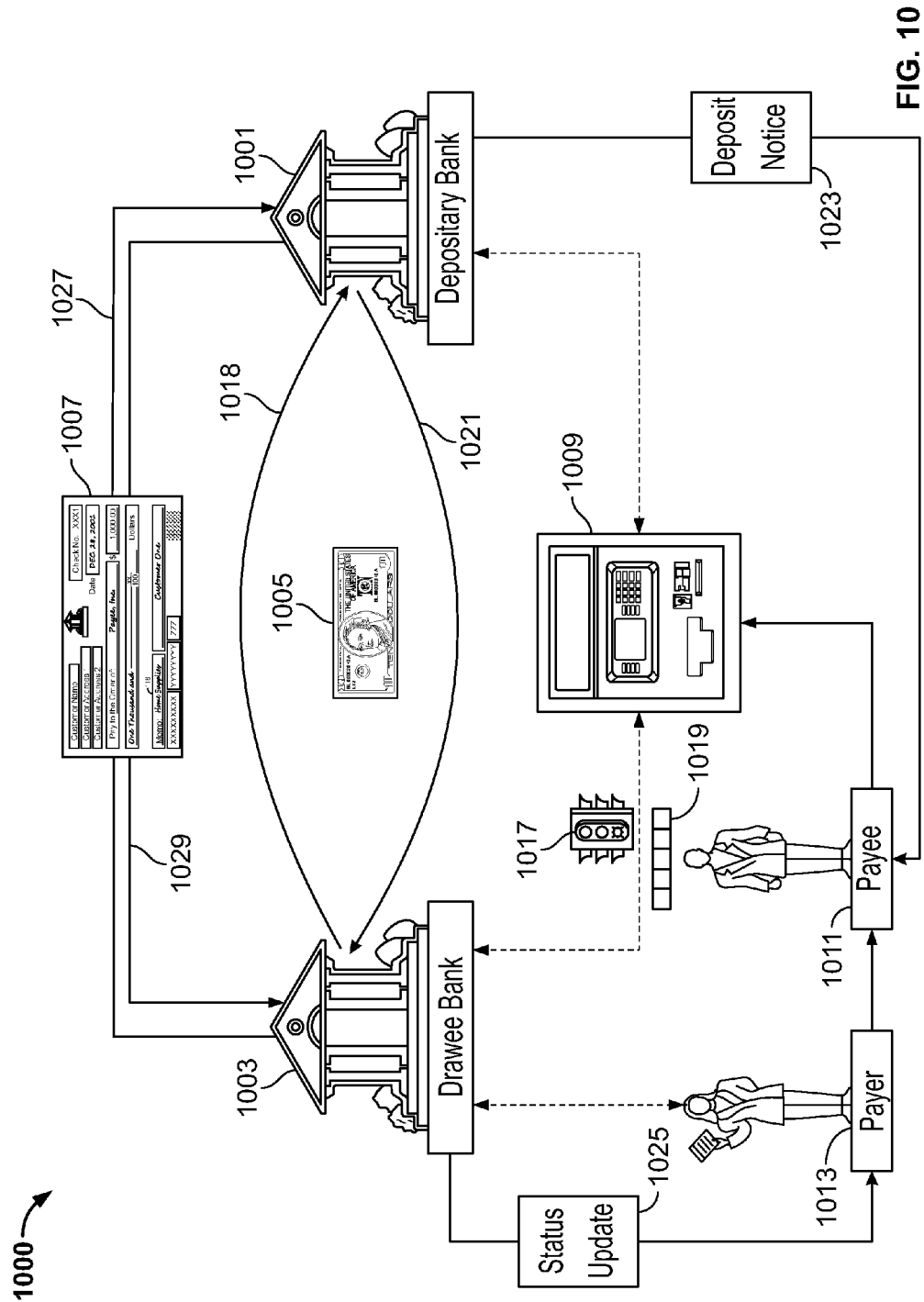
FIG. 10 shows an illustrative process in accordance with principle of the invention.

FIG. 10 shows illustrative check clearing process 1000. A check deposited by payee 1011 may be subject to check clearing process 1000. For the sake of illustration, one or more of the steps of the process illustrated in FIG. 10 will be described as being performed by a "system." The "system" may include one or more of the features of the apparatus, arrangements or processes shown in FIGS. 1-9 and/or any other suitable device or approach. The "system" may be provided by an entity. The entity may be an individual, an organization or any other suitable entity.

Process 1000 may include participants such as a payer 1013, drawee bank 1003, payee 1011 and depositary bank 1001.

Payer 1013 may issue a check to payee 1011. The check may include an order issued by payer 1013. The order may direct drawee bank 1003 to pay an amount, the amount indicated on the check, to payee 1011.

Payee 1011 may deposit the check. Payee 1011 may deposit the check at self-service kiosk 1009. Self-service kiosk 1009 may be an ATM. Payee 1011 may request that depositary bank 1001 credit an account of the payee based on the deposit of the check. Self-service kiosk 1009 may be associated with drawee bank 1003. Self-service kiosk 1009 may be associated with depositary bank 1001. Self-service kiosk 1009 may be associated with a financial institution that is neither drawee bank 1003 nor depositary bank 1001.

Self-service kiosk 1009 may be configured to generate digital image 1007 of the check. Self-service kiosk 1009 may be configured to generate transaction record 1019. Transaction record 1019 may include one or more features of ledger entry 800 (shown in FIG. 8) or issue file 900 (shown in FIG. 9). Transaction record 1019 may be generated based on information extracted from digital image 1007. Digital image 1007 and transaction record 1019 may be generated by self-service kiosk 1009 or depositary bank 1001.

Depositary bank 1001 may transmit digital image 1007 to drawee bank 1003 using path 1029. Drawee bank 1003 may securely store digital image 1007.

Transaction record 1019 may be transmitted to drawee bank 1003. Self-service kiosk 1009 may transmit image 1007 to drawee bank 1003. Drawee bank 1003 may be identified based on MICR data on the check. Drawee bank 1003 may be identified based on any suitable information extracted from digital image 1007, such as logo 645 (shown in FIG. 6). Drawee bank 1003 may securely store transaction record 1019.

Drawee bank 1003 may conduct a fraud detection analysis based on transaction record 1019. The fraud analysis may include comparing one or more fields of transaction record 1019 to financial information known or accessible to drawee bank 1003. The financial information known or accessible to drawee bank 1003 may include one or more fields of a ledger entry maintained by drawee bank 1003. The ledger entry may include one or more features of ledger entry 800 (shown in FIG. 8) and may list checks issued by or on behalf of payer 1013. An issue file such as issue file 900 (shown in FIG. 9) may be generated based on the fraud analysis.

Drawee bank 1003 may transmit fraud indicator 1017 to payer 1013 via status update 1025. Based on the fraud indicator, payer 1013 may reject the deposit submitted by payee 1011. Path 1027 represents drawee bank 1003 rejecting a deposit submitted by payee 1011.

Fraud indicator 1017 may be transmitted to depositary bank 1001 or payee 1011. Fraud indicator 1017 may be transmitted to payee 1011 before payee 1011 ends a session at self-service kiosk 1009.

Based on fraud indicator 1017, drawee bank 1003 may transfer funds 1005 to depositary bank 1001. The amount of funds 1005 may correspond to an amount extracted from digital image 1007.

In response to an acceptance of a deposit submitted by payee 1011, drawee bank 1003 may transfer funds 1005 to depositary bank 1001. In response to an acceptance or rejection of a deposit submitted by payee 1011, drawee bank 1003 may transmit status update 1025 to payer 1013. Status update 1025 may be presented to payer 1013 via issue file 900 (shown in FIG. 9).

Status update 1025 may inform payer 1013 that a default action has been applied to the deposit submitted by payee 1011. Status update 1025 may inform payer 1013 that funds have been withdrawn from an account at drawee bank 1003 to cover the deposit of payee 1011.

In some embodiments, payer 1013 may be offered a claw-back or return payment service. Using the claw-back or return payment service, payer 1013 may recover funds transferred to an account of payee 1011 at depositary bank 1001. The claw-back service may utilize path 1021. Payer 1013 may trigger the claw-back service in response to viewing an image available via issue file 900 (shown in FIG. 9).

In response to a successful deposit and crediting of an account of payee 1011 at depositary bank 1001, deposit notice 1023 may be transmitted to payee 1011. Deposit notice 1023 may inform payee 1011 if payer 1013 has access to a claw-back or return payment service.

The invention may be operational with numerous other general purpose or special purpose computing system environments or configurations. Examples of well-known computing systems, environments and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for digital image shifting have been provided. Persons skilled in the art will appreciate that the present invention can be practiced by other than the described embodiments, which are presented for purposes of illustration rather than of limitation. The present invention is limited only by the claims that follow.

What is claimed is:
1. is amended to read as follows:
A treasury management system comprising:
   a processor; and
   a non-transitory computer readable media storing instructions that when executed by the processor configure a computer to:
      generate an issue file, the issue file comprising a plurality of payments and a check service associated with each payment entries, each entry corresponding to a check issued by a payer, wherein each entry comprises a check identifier and a pre-selected check service;
      receive a plurality of check images, each check image generated based on a check deposited by a payee; and
      for each of the plurality of check images, determine if the deposited check corresponds to a check identifier from an entry included in the issue file and:
         if the deposited check corresponds to a check identifier from an entry included in the issue file:
            display to the payer in a first carousel view a corresponding check image, wherein the first carousel view comprises a first position that displays the entire surface area of the check image and a second position that displays less than the entire surface area of the check image, wherein the first position is a reference position and the second position is defined by an angular distance from the reference position; and
            apply a watermark to the check image, the watermark including text associated with the pre-selected check service from the entry, wherein the watermark is viewable only when the check image is in the first position; and if the deposited check does not correspond to a check identifier from an entry included in the issue file:

display to the payer in a second carousel view a corresponding check image, wherein the second carousel view comprises a first position that displays the entire surface area of the check image and a second position that displays less than the entire surface area of the check image, wherein the first position is a reference position and the second position is defined by an angular distance from the reference position;

embed in the check image an available check service and a selectable option to apply the available check service to the deposited check, wherein the available check service and the selectable option are viewable only when the check image is in the first position; and display an indication of time remaining to apply the available check services to the deposited check.

2. The treasury system of claim 1 wherein the non-transitory computer readable media stores instructions that when executed by the processor configure the computer to adjust a color indicator displayed to the payer in response to a change in the time remaining to apply the check service.

3. The treasury system of claim 1 wherein the check service corresponds to a stop payment.

4. The treasury management system of claim 1 wherein the non-transitory computer readable media stores instructions that when executed by the processor configure the computer to display adjacent to each check image in the second carousel view:

a pay indicator; and a return indicator;

wherein a selection by the payer of the pay indicator or the return indicator moves the check image to the first carousel view.

5. The treasury management system of claim 1 wherein the non-transitory computer readable media stores instructions that when executed by the processor configures the computer to, after expiration of the time remaining, apply a default check service to each check image in the second carousel view.

* * * * *